United States Patent [19]

Mishima

[11] 4,209,929
[45] Jul. 1, 1980

[54] LANCE FOR SPEAR FISHING

[76] Inventor: Robert K. Mishima, 576-B Kukuau St., Hilo, Hi. 96720

[21] Appl. No.: 956,259

[22] Filed: Oct. 30, 1978

[51] Int. Cl.² ............................................. A01K 81/04
[52] U.S. Cl. ............................................. 43/6; 294/61
[58] Field of Search ............... 43/6; 294/19 R, 24, 294/61, 126; 16/110.5; 145/61 E, 61 J, 62; 279/1 Q, 102, 103

[56] References Cited

U.S. PATENT DOCUMENTS

| | | | |
|---|---|---|---|
| 1,252,632 | 1/1918 | Voje | 16/110.5 |
| 2,353,662 | 7/1944 | Goldman | 43/6 |
| 2,442,974 | 6/1948 | Frederiksen | 43/6 |
| 2,641,478 | 6/1953 | Sigg | 279/102 |
| 3,004,362 | 10/1961 | Day | 43/6 |
| 3,150,460 | 9/1964 | Dees | 43/6 |
| 3,426,813 | 2/1969 | Robertson | 16/110.5 |
| 3,766,678 | 10/1973 | Reaves | 43/6 |
| 4,052,808 | 10/1977 | Crabtree | 43/6 |

Primary Examiner—Othell M. Simpson
Assistant Examiner—Roscoe V. Parker
Attorney, Agent, or Firm—Clarence A. O'Brien; Harvey B. Jacobson

[57] ABSTRACT

The lance is composed of a hollow tubular shaft having a cap connected to one end thereof. The cap is disengageable from the shaft for allowing access to the interior of the shaft. The cap is connected to a resilient band for carrying of the spear and propelling it through the water. The opposite end of the spear contains an insert having an axially running socket located centrally thereof for accepting a spearhead. The spearhead is held within the insert by surgical tubing which covers a portion of the insert and a portion of the spearhead. The surgical tubing also provides an airtight seal between the spearhead and the insert. The spearhead is, therefore, held within the insert by a frictional engagement with the surgical tubing as well as the suction created between the spearhead and the insert socket.

9 Claims, 6 Drawing Figures

U.S. Patent  Jul. 1, 1980  4,209,929
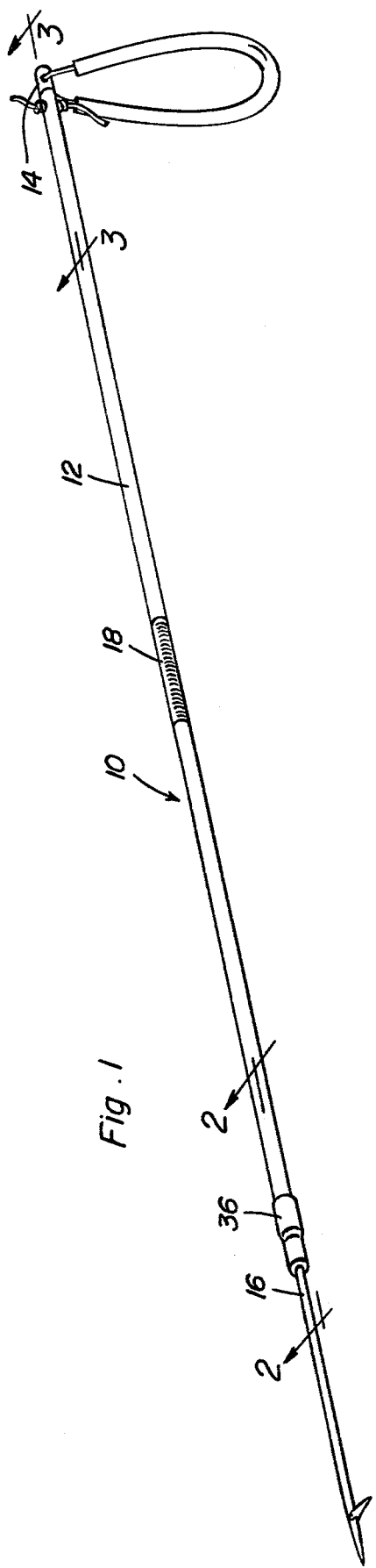
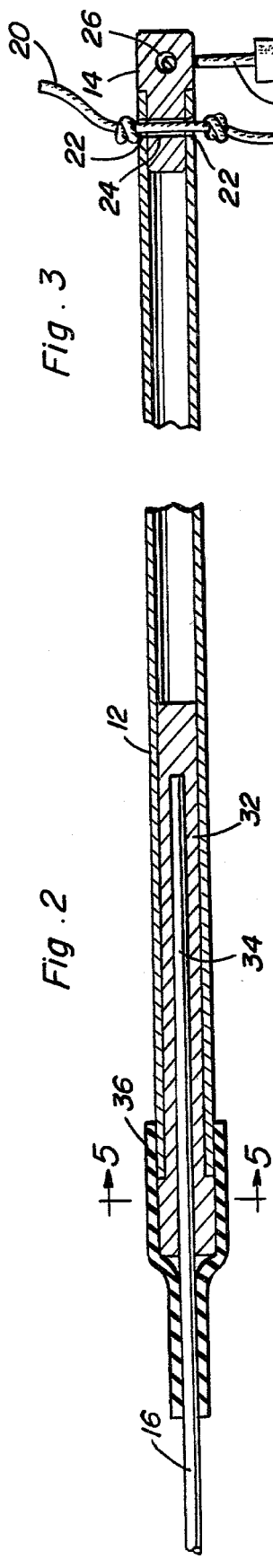
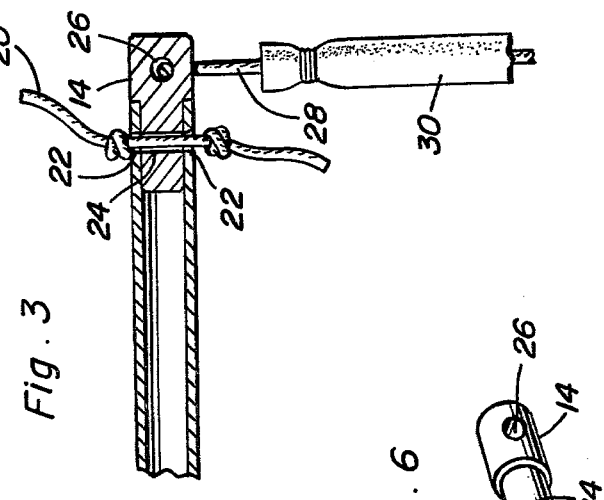
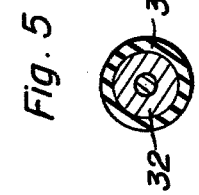
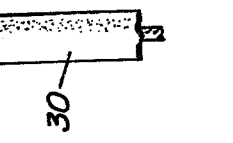

LANCE FOR SPEAR FISHING

BACKGROUND OF THE INVENTION

1. Field of the Invention

This invention relates to a lance for spear fishing having unique features which contribute to the safety and versatility of the lance.

2. Description of the Prior Art

In the past, it has been recognized that in order for a lance to provide maximum value in spear fishing, versatility of the lance in its ability to utilize any one of a number of spearheads in order to make the lance useful for the spearing of different fish in different circumstances is a necessity. Furthermore, a construction is necessary whereby the unused spearheads may be stored in a convenient location for use in the event that a change in spearheads becomes desirable. Certain prior art relating to unique features incorporated in lances includes U.S. Pat. No. 2,353,662, issued July 18, 1944, to Goldman, which discloses an implement for use in life rafts. The Goldman device includes a shaft having a paddle at one end and a spearhead, which may be stored interiorly of the shaft, for connection to the opposite end. U.S. Pat. No. 2,442,974, issued June 8, 1948, to Frederiksen, discloses an improved fish spear in which a spearhead is inserted in a tubular shaft. The shaft contains a spring loaded mechanism used to propel the spearhead forwardly upon actuation of a trigger mechanism by the user. U.S. Pat. No. 3,004,362, issued Oct. 17, 1961, to Day, shows a shaft having a multipurpose adapter which permits interchangeable implements to be applied or removed quickly from the shaft. The adapter includes a radially extending spring loaded element which will be biased by its spring into an aperture in the selected implement. U.S. Pat. No. 3,150,460, issued Sept. 29, 1964, to Dees, discloses a fishing device which includes a plurality of implements which are adapted to threadedly engage with a telescoping handle. U.S. Pat. No. 3,766,678, issued Oct. 23, 1973, to Reaves, teaches the use of a harpoon-flying gaff which has a fish spearing element which slidably engages one end of a handle. U.S. Pat. No. 4,052,808, issued Oct. 11, 1977, to Crabtree, shows a collapsible fish spear including a number of lengths of hollow rod which are telescopically interlocked to form a single rod. The forward length of rod includes a removable projecting spear unit for spearing fish. At one end of the rod, an elastic loop is secured for propelling the spear through the water to spear fish.

SUMMARY OF THE INVENTION

An object of the present invention is to provide a lance for spear fishing which lance includes a hollow tubular shaft, including a removable cap on one end for allowing the storage of spare spearheads when not in use.

A further object of the present invention is to provide an unique attachment structure for connecting a spearhead to the lance shaft. The attachment is effected through frictional engagement in combination with a vacuum created by the expulsion of air upon insertion of the spearhead.

Yet a further object of the present invention is to provide an end cap for the tubular shaft of the lance which connects an elastic strap to the lance for facilitating the carrying of the lance as well as propelling the lance through the water.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the lance.

FIG. 2 is a sectional view taken substantially along a plane passing through section line 2—2 of FIG. 1 and shows the interconnection of the lance body with the spearhead.

FIG. 3 is a sectional view taken substantially along a plane passing through section line 3—3 of FIG. 1 and shows the interconnection of the end cap with the lance body.

FIG. 4 is an enlarged view of the surgical tubing used for the connection of the spearhead to the lance body.

FIG. 5 is a sectional view taken substantially along a plane passing through section line 5—5 of FIG. 2.

FIG. 6 is a perspective view of the end cap.

DESCRIPTION OF THE PREFERRED EMBODIMENT

Now with reference to the accompanying drawings, the lance which is generally referred to by the numeral 10 will be more specifically set forth in detail. As will be immediately apparent upon inspection of FIG. 1 of the drawings, the lance comprises a central body portion 12 which has attached thereto end cap 14 at one end and spearhead 16 at the other end. Body 12 is preferably composed of a single length of hollow aluminum tubing having a length of approximately 72 inches. Located centrally of the tubing is a cord 18 which is wrapped in a helical manner about the tubing and attached thereto by means of glue, or any other suitable attachment mechanism. Cord 18 provides a handle grip for grasping the tubing when carrying or propelling same.

At the rear of body 12, as seen in FIG. 3, end cap 14 is provided for sealing off the open rear end of the aluminum tube. End cap 14 connects to the aluminum tube in a telescopic manner with the smaller diameter portion of the cap being inserted into the tube interior. The end cap is maintained in position upon body 12 through the use of cord 20 which passes through holes 22 of the body 12 and coaxial opening 24 of the end cap. It will be noted that any suitable clip or threaded attachment device will serve as well as cord 20 to maintain the end cap in position. The end cap 14 also has an enlarged outer portion having a diameter substantially equal to the outside diameter of body 12. Disposed within this section of the cap is aperture 26 through which cord 28 is disposed. Cord 28 is in turn attached by any suitable means to elastic band 30. Band 30 may be used to propel the lance in a known manner, if desired, or may be used to provide a handle for carrying of the lance when not in use.

On the forward end of the body 12, there is attached an insert 32. Insert 32 telescopes within the body 12 and is permanently affixed therein. Insert 32 has one section which forms the male portion of the telescopic relationship. This section has an outer diameter which is approximately equal to the inner diameter of the tubing of body 12. The outer section of the insert 32 has a diameter which is approximately equal to the outer diameter of body 12. The insert may be maintained within the body by the use of press fitting, glue, or any other suitable connection. An axially extending socket 34 is drilled in the insert. Socket 34 extends to a position proximate to the end of insert 32 but does not extend entirely through the insert. A section of tubular elastomeric material 36 which may be, for example, any standardly available surgical tubing, is disposed over the end of insert 32 and body 12. The elastomeric material 36 remains in position upon these elements by virture of the elastic properties of the material. However, glue, or any other suitable means, may be used to enhance this attachment. As seen in FIG. 5, the elastomeric material 36 is disposed upon tube 12 in such a manner as to force the tip of the material to extend from the body in an angular orientation therewith. This result may be achieved by the pulling of one-half of the elastomeric tubing onto the body 12 further than the other half of the elastomeric tubing, as seen in FIG. 2 wherein the lower portion of the tubing is depicted as extending onto the body 12 further than the upper portion of the tubing. The elastomeric tubing has an internal diameter which is slightly less than the diameter of spearhead 16. In this manner, spearhead 16 may be inserted within the elastomeric tubing 36 and the socket 34 formed in insert 32. Insertion of the spearhead in this manner expels the air from within socket 34, which has a diameter slightly greater than the outer diameter of spearhead 16. Tubing 36 forms an airtight seal with the spearhead 16 and also forms a frictional engagement therewith which is enhanced by the angular orientation taken on by tubing 36. Due to the expelled air, together with the frictional engagement, any attempt to remove the spearhead 16 from the body will be met with resistance of friction and suction between the spearhead and socket. Of course, the spearhead may be removed by the use of appropriate force by the user, this force being greater than that normally applied by a fish which would be typically speared by the use of the device.

In use, spearhead 16 or any other suitable spearhead may be stored within the confines of body 12 when not in use, such as when the lance is being transported. The interior space provided by the body 12 is sufficiently great to allow the storage of several spearheads so that the user of the lance may have a choice according to his needs. The appropriate spearhead may be chosen and quickly inserted, being thereafter held in place by the attachment mechanism described hereinabove. As the user wishes, the spearhead may be quickly removed and replaced with an alternate lance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A lance for spear fishing comprising: an elongated hollow tubular body; a section of elastomeric tubing material having one end attached to said tubular body and having a free end thereof extending away from said body; an elongated spearhead member having a transverse dimension slightly greater than the inner diameter of said elastomeric tubing material, said spearhead being insertable into said tubing material and being frictionally held therein; and an insert securely connected to the interior of said tubular body and having a longitudinally extending socket beginning at one end of said insert and extending to a position spaced from the opposite end of said insert with the socket having cross-sectional dimensions similar to but slightly greater than the cross-sectional dimensions of said spearhead to produce a snug fit therebetween, the spearhead being insertable through said elastomeric tubing and into said socket, thereby forming an airtight engagement between said spearhead, elastomeric tubing and socket, thereby holding said spearhead in said aperture by a suction engagement formed upon an attempted removal of said spearhead from said socket.

2. The lance of claim 1 and further wherein said elastomeric tubing material is attached to said tubular body with said free end extending away from said body at an angular orientation therewith, thereby enhancing said frictional engagement.

3. The lance of claim 1 and further including a cap means releasably engaged with the rear of said body member, said cap means having a flexible band attached thereto.

4. The lance of claim 1 and further including a cap means attached to the end of said body opposite said elastomeric material, said cap means being releasably engageable with said body and being attached to a resilient band of material formed in a loop for providing a carrying handle for the lance.

5. The lance of claim 4 wherein said cap is attached to said body by a connection means which extends through coaxial openings in said body and said cap.

6. The lance of claim 3 wherein said cap is connected to said body by a connection means which passes through coaxial openings in said cap and said body.

7. The device of claim 5 and further including a handle means located centrally of said body portion for providing a non-slip surface for grasping said lance.

8. The device of claim 7 wherein said handle means comprises a length of cord helically wound about said body means.

9. The device of claim 6 wherein said elastomeric material comprises surgical tubing.

* * * * *